US012794400B2

(12) United States Patent
Kroyzer et al.

(10) Patent No.: US 12,794,400 B2
(45) Date of Patent: Nov. 10, 2026

(54) OPTIMIZATION OF A VALUE FUNCTION FOR SHARING AN AVAILABLE SOLAR RESOURCE

(71) Applicant: NEXTPOWER LLC, Fremont, CA (US)

(72) Inventors: Gil Kroyzer, Jerusalem (IL); Israel Kroizer, Jerusalem (IL); Greg Ravikovich, Mevaseret Tzion (IL); Moshe Horowitz, Jerusalem (IL); Morag Am Shallem, Jerusalem (IL); Joseph Schwarzbach, Jerusalem (IL)

(73) Assignee: NEXTPOWER LLC, Fremont, CA (US)

( * ) Notice: Subject to any disclaimer, the term of this patent is extended or adjusted under 35 U.S.C. 154(b) by 0 days.

(21) Appl. No.: 18/383,484

(22) Filed: Oct. 25, 2023

(65) Prior Publication Data

US 2024/0146237 A1 May 2, 2024

Related U.S. Application Data

(60) Provisional application No. 63/419,410, filed on Oct. 26, 2022.

(51) Int. Cl.
*H02S 20/32* (2014.01)
*G06Q 10/04* (2023.01)
(Continued)

(52) U.S. Cl.
CPC ............. *H02S 20/32* (2014.12); *G06Q 10/04* (2013.01); *G06Q 50/02* (2013.01); *H02S 50/10* (2014.12)

(58) Field of Classification Search
CPC ......... H02S 20/32; H02S 50/10; G06Q 10/04; G06Q 50/02
See application file for complete search history.

(56) References Cited

U.S. PATENT DOCUMENTS 5,228,924 A * 7/1993 Barker .................... H02S 20/30
136/246
7,039,592 B1 * 5/2006 Yegge .................... G06Q 40/12
705/4
(Continued)

FOREIGN PATENT DOCUMENTS

CN 111094866 A 5/2020
JP 2017145565 A 8/2017
(Continued)

OTHER PUBLICATIONS

International Search Report for PCT/IB2023/060756 document completed Mar. 4, 2024.
(Continued)

*Primary Examiner* — Angelo Trivisonno
(74) *Attorney, Agent, or Firm* — Fredrikson & Byron, P.A.

(57) ABSTRACT

A method of operating a solar energy collection system comprising an array of pivotable PV modules and a group of plants arranged to produce a crop, includes performing a optimization of a value function based on a current state, responsively to predicted insolation, by dynamically determining one or more orientations for the array of PV modules, and controlling, based on the optimization of the value function, at least one of the PV modules to switch orientation to increase or decrease instantaneous photovoltaic conversion of incident solar radiation by the array of PV modules and/or increase or decrease instantaneous photosynthetic conversion of the incident solar radiation by the group of plants.

18 Claims, 9 Drawing Sheets

(51) Int. Cl.
*G06Q 50/02* (2012.01)
*H02S 50/10* (2014.01)

(56) References Cited

U.S. PATENT DOCUMENTS

| | | | | |
|---|---|---|---|---|
| 11,817,816 | B2 | 11/2023 | Kroyzer | |
| 11,824,363 | B2 | 11/2023 | Kroyzer | |
| 2011/0174294 | A1* | 7/2011 | Adel | F24S 23/77 126/714 |
| 2012/0031314 | A1* | 2/2012 | Bigelow | A01G 23/00 56/1 |
| 2017/0126172 | A1* | 5/2017 | Nogier | F24S 50/40 |
| 2020/0083838 | A1* | 3/2020 | Sgarrella | A01G 13/21 |
| 2022/0407313 | A1 | 12/2022 | Kroyzer | |
| 2023/0039146 | A1 | 2/2023 | Kroyzer | |
| 2023/0044525 | A1 | 2/2023 | Kroyzer | |
| 2024/0146237 | A1 | 5/2024 | Kroyzer | |
| 2024/0171124 | A1 | 5/2024 | Azancot | |
| 2024/0186941 | A1 | 6/2024 | Kroyzer | |
| 2024/0204722 | A1 | 6/2024 | Kroyzer | |

FOREIGN PATENT DOCUMENTS

| | | | |
|---|---|---|---|
| KR | 20220001283 | A | 1/2022 |
| WO | 2013/117722 | A1 | 8/2013 |

OTHER PUBLICATIONS

Written Opinion for PCT/IB2023/060756 document completed Mar. 4, 2024.

* cited by examiner

OPTIMIZATION OF A VALUE FUNCTION FOR SHARING AN AVAILABLE SOLAR RESOURCE

FIELD OF THE INVENTION

The present invention relates to solar energy systems and in particular to systems and methods for sharing an available solar resource between electricity generation by an array of photovoltaic (PV) assemblies and growing crops from plants disposed under and in proximity to the array, using tracking systems arranged to pivot the PV assemblies.

BACKGROUND

Achieving a diversified low-carbon emissions energy economy has been limited by economic and technological limitations. Solar energy systems comprising photovoltaic (PV) arrays are commonly deployed to capture energy from both direct and diffuse (including reflected) solar irradiance. Tracking PV systems are deployed in which PV arrays are pivoted to reduce the cosine losses of the direct irradiance component, so-called because the energy absorbed is a function of the cosine of the angle between the incidence vector and a normal vector of the PV array.

PV arrays serve to generate electricity when solar illumination is incident upon the arrays. Generated electricity is typically fed into an electrical grid of the city/locality.

The demand for solar electricity and shortage of suitable, available land have led to trying to install PV arrays where crops are grown, and even to integrate management of the PV panels with the agricultural enterprise. This leads to a conflict between the PV array and the plants which both require the solar resource—for generating electricity and growing crops, respectively. The naïve solutions are arbitrary and involve trial and error. There is a need for methods and systems which can optimize, over any appropriate time frame, the splitting of the shared solar resource based on a value function that takes into account the saleable value of the products (electricity and crops), the operational constraints of both the PV and the plants, and any other utility functions.

SUMMARY

A solar energy collection system according to embodiments of the present disclosure comprises: (a) an array of photovoltaic (PV) modules arranged to be pivoted about a longitudinal axis of the array by a drive system comprising an electric motor and a gearing arrangement; (b) a group of plants arranged to produce a crop; and (c) a controller configured to control the array of PV modules. The controller is configured to perform an optimization of a value function based on a current state thereof, responsively to predicted insolation, by dynamically determining one or more orientations for the array of PV modules, and to control, based on the optimization of the value function, at least one of the PV modules to switch between a respective first orientation to a respective second orientation to increase a first one of: (i) instantaneous photovoltaic conversion of incident solar radiation by the array of PV modules and (ii) instantaneous photosynthetic conversion of the incident solar radiation by the group of plants.

In some embodiments, the switching between the respective first orientation to the respective second orientation can be effective to decrease a second one of: (i) instantaneous photovoltaic conversion of incident solar radiation by the array of PV modules and (ii) instantaneous photosynthetic conversion of the incident solar radiation by the group of plants.

In some embodiments, the switching from the respective first orientation to the respective second orientation can be effective to increase a value of the current state.

In some embodiments, optimizing the value function can include maximizing a revenue stream. In some embodiments, optimizing the value function can include maximizing an indirect utility function.

In some embodiments, the controller can be configured to receive feedback regarding actual insolation, and to update the current state based on the feedback.

In some embodiments, the optimization of the value function can be to the end of a crop-growing season. In some embodiments, the optimization of the value function can be to the end of an accounting period. In some embodiments, the optimization of the value function can be based in part on a multi-season crop-growing regime.

In some embodiments, the optimization of the value function can be based in part on differentiated selling prices for electricity generated by the solar energy collection system.

A method is disclosed, according to embodiments of the present disclosure, for operating a solar energy collection system. The solar energy collection system comprises an array of pivotable photovoltaic (PV) modules and a group of plants arranged to produce a crop. The method comprises, at a first time: (i) performing a first optimization of a value function based on a current state, responsively to predicted insolation, by dynamically determining one or more orientations for the array of PV modules, and (ii) controlling, based on the first optimization of the value function, at least one of the PV modules to switch from a respective first orientation to a respective second orientation to increase instantaneous photovoltaic conversion of incident solar radiation by the array of PV modules and decrease instantaneous photosynthetic conversion of the incident solar radiation by the group of plants. The method also comprises, at a second time: (i) performing a second optimization of a value function based on a current state, responsively to predicted insolation, by dynamically determining one or more orientations for the array of PV modules, and (ii) controlling, based on the second optimization of the value function, at least one of the PV modules to switch from the respective second orientation to the respective first orientation to decrease the instantaneous photovoltaic conversion and increase the instantaneous photosynthetic conversion.

In some embodiments, it can be that each switching from the respective first orientation to the respective second orientation or from the respective second orientation to the respective first orientation increases a value of the current state.

In some embodiments, the optimizations of the value function can include maximizing a revenue stream. In some embodiments, the optimizations of the value function can include maximizing an indirect utility function.

In some embodiments, method can additionally comprise: receiving feedback regarding actual insolation, and/or updating the current state based on the feedback.

In some embodiments, it can be that at least one of the first and second optimizations of the value function is to the end of a crop-growing season. In some embodiments, it can be that at least one of the first and second optimizations of the value function is to the end of an accounting period. In some embodiments, it can be that at least one of the first and second optimizations of the value function is based in part on a multi-season crop-growing regime. In some embodiments, it can be that at least one of the first and second optimizations of the value function is based in part on differentiated selling prices for electricity generated by the solar energy collection system.

A method is disclosed, according to embodiments of the present disclosure, for operating a solar energy collection system. The system comprises an array of pivotable photovoltaic (PV) modules and a group of plants arranged to produce a crop. The method comprises: (a) performing an optimization of a value function based on a current state, responsively to predicted insolation for a prediction period, by dynamically determining an allocation of the predicted insolation for the prediction period between the PV modules and the plants; (b) calculating, based on the optimization of the value function, one or more orientations for the array of PV modules for accomplishing the determined allocation; and (c) controlling, based on the calculating, at least one of the PV modules to switch from a respective first orientation to a respective second orientation, wherein the switching from the respective first orientation to the respective second orientation increases a value of the current state.

In some embodiments, the method can additionally comprise: at a second time, controlling, based on a second calculating, at least one of the PV modules to switch from the respective second orientation to the respective first orientation. In such embodiments, the switching from the respective second orientation to the respective first orientation can increase a value of the current state.

In some embodiments, the optimization of the value function can include maximizing a revenue stream. In some embodiments, the optimization of the value function can be based in part on differentiated selling prices for electricity generated by the PV modules.

In some embodiments, the optimization of the value function can include maximizing an indirect utility function. In some embodiments, the indirect utility function can include at least one of a societal utility function and an environmental utility function. In some embodiments, the indirect utility function can be based on adherence to a regulation, rule or standard. In some embodiments, the indirect utility function can be based on a contractual term. In some embodiments, the indirect utility function can be based on projected health of the plants. In some embodiments, the indirect utility function can be based on a projected lifetime or lifecycle cost of one or more components of the PV modules.

In some embodiments, the method can additionally comprise: receiving feedback regarding actual insolation, and updating the current state based on the feedback.

In some embodiments, the optimization of the value function can be to an end of a crop-growing season or to an end of an accounting period. In some embodiments, the optimization of the value function can be based in part on a multi-season crop-growing regime.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings.

DETAILED DESCRIPTION OF THE ILLUSTRATED EMBODIMENTS

Figure 1:
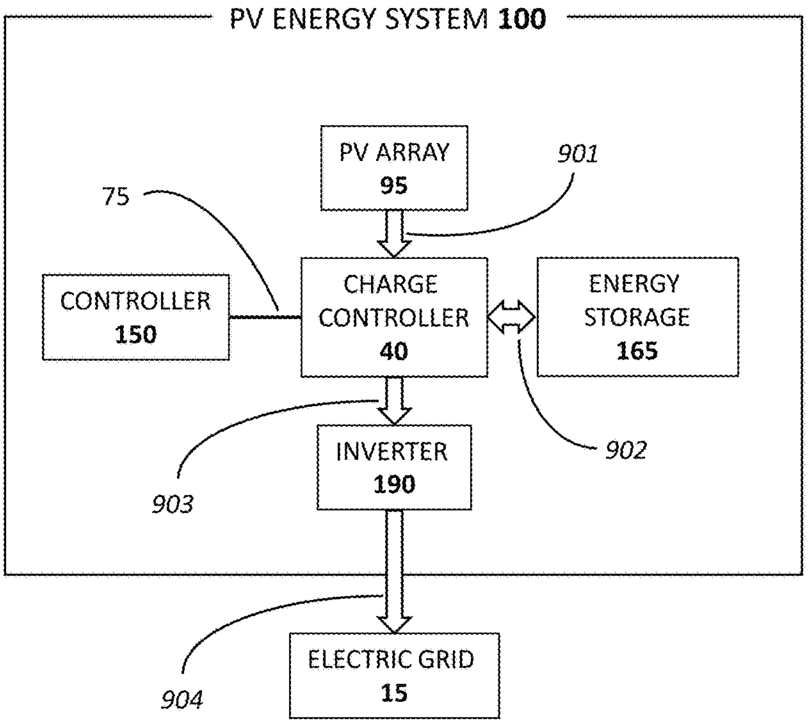
FIG. 1 shows a block diagram of a photovoltaic (PV) energy collection system, according to embodiments of the present invention.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

The term 'solar energy collection system' as used herein means a system for producing electricity from PV modules and growing crops from plants that are at least partly shaded by the PV modules. A solar energy collection system includes: (i) a PV energy system for generating electricity using an array of PV modules, generally but not necessarily including an inverter for converting the direct-current (DC) electricity generated by the PV modules to alternating current (AC) electricity, e.g., for delivery to an electricity grid, and optionally an energy storage device for short-term or long-term storage of DC electricity for later conversion to AC and/or stabilization of the output of the PV system; and (2) a collection of plants for growing crops.

Embodiments disclosed herein relate to optimizing the sharing of the solar resource, i.e., incident solar radiation, between photovoltaic (PV) conversion by arrays of PV modules for generating electricity, and photosynthetic conversion by plants for growing plants. The optimizing includes maximizing a value function that gives weight to various aspects of the electricity generation and crop-growing in accordance with desired outcomes. Examples of desired outcomes can include, whether singly or in combination, and not exhaustively: maximized combined revenues from selling electricity and crops, maintaining plant health including long-term plant health, meeting contractual obligations for deliveries of electricity and/or crops, delivering electricity according to preferred times or days of delivery, extending the life of the components of the PV energy system, maximizing environmental contribution, e.g., reduction of net carbon dioxide or other emissions in comparison with alternative sources of electricity and/or plants, return on investment in the solar energy collection system, or any other financial indicators. In accordance with the desired outcomes, the value function can be based on values associated with and/or assigned to any number of parameters that can be used to measure progress relative to the desired outcomes. For example, the parameters can include, and not exhaustively: units of electricity generated and/or crops produced (and when generated or produced), revenue generated, adherence to a short- or long-term (including, e.g., multi-year) growing regime, adherence to an electricity delivery plan, contribution to environmental goals, e.g., plant mass grown for carbon dioxide absorption, and so on. Moreover, the optimal growing conditions of the selected plants are taken into account in the parameters of the value function, as not every type of plant maximizes crop value with the same optimal pattern of solar resource availability.

The value function has a current state that can be updated at any given time with, e.g., actual insolation data including information on how the actual insolation has been shared until the current time. The value function can generally be optimized on a going-forward basis, i.e., starting each time from the current state and extending into the future based on forecasted insolation. Forecasted insolation can include any combination of short-term forecasted insolation, e.g., the next 5, 10, 15, 20, 30 or more minutes, or mid-term forecasted insolation, e.g., the next hour, two hours, 4 hours, 8 hours, 24 hours, 48 hours, 36 hours, 40 hours or longer, or long-term forecasted insolation, e.g., a week, a month, a growing season, a year, or a multi-year period. Insolation forecasts can be acquired using a local forecasting system such as is described below with reference to FIG. 4, or can be provided for any length of time desired in any frequency desired using, e.g., internal or commercial meteorological models or external providers.

The value function can be optimized over a time period that ends, e.g., at the end of a growing season, at the end of an accounting period such as a calendar year or fiscal year, or any other time period desired.

The PV modules of the PV energy system are pivotable by a motor assembly in communication with a control system, generally called a 'controller' in the disclosure, the controller generally being separate from a 'charge controller' of the PV energy system which directs DC electricity to and from the energy storage device. The terms 'PV panels', 'PV modules', and 'PV assemblies' are used interchangeably, and all relate to the active electricity-generating elements of PV assemblies.

The expression 'based on' as used throughout the disclosure means 'at least partly based on' and does not imply 'exclusively based on'.

The pivoting of the PV modules relates to two types of operation. In 'on-sun' operation, the PV modules can be pivoted to an 'on-sun' position in which the active faces of the respective PV modules are normal, or close to normal, to the incoming radiation of the sun on at least one axis of rotation. This position tend to increase or maximize the incidence of the direct component of insolation on the PV modules by minimizing the cosine of the angle between the incident direct radiation and the normal vector of the active face of the PV module. On-sun operation includes incremental pivoting called 'tracking' so as to maintain the normal or near-normal on-sun position over time in accordance with the apparent movement of the sun across the sky due to the earth's rotation. In 'off-sun' operation, the PV modules are pivoted to and from other orientations that are not on-sun, i.e., which increase the cosine of the angle between the vector normal to the plane of the PV module and the direct vector of the incident solar radiation relative to the on-sun position, and which do not maximize PV conversion of the direct normal component of the solar radiation. Off-sun operation can also optionally include tracking, e.g., to maintain the angle between the normal vector of the PV module and the direct vector of the incident solar radiation as the sun angle changes with the earth's rotation. Off-sun operation can be used for various purposes and in various scenarios; in the embodiments disclosed herein, off-sun operation is commonly used to control the share of solar resource (solar radiation) that is directed to the PV modules and the share of solar resource that is directed to the plants for growing crops.

As a general note, this disclosure frequently refers to solar radiation without distinguishing between direct and diffuse (including reflected) radiation. This is for purposes of clarity, as the description of the disclosed embodiments would become unnecessarily complicated if every calculation were to take into account diffuse radiation. For example, when direct radiation on the surface of a PV panel is reduced by pivoting the panel to be off-sun, and the angle between the normal vector of the panel and the incoming vector of the direct solar radiation increases so as to reduce direct normal radiation as a function of the cosine of said angle, the skilled practitioner must take into account that the diffuse radiation reaching the face of the panel may not decrease, and in some cases could even increase, e.g., from additional reflected radiation available from a light-colored ground surface. As a further example, neither the PV panels nor the plants would ever necessarily be entirely without solar radiation during the solar day even if turned away from the sun (in the case of the PV panels) or blocked by PV panels (in the case of the plants), since diffuse radiation can equal 5% or more, or 10% or more, or even 20% or more, of the total incident radiation, depending on atmospheric conditions. Nonetheless, despite ignoring these considerations in this disclosure for purposes of convenience only, the scope of the methods described in the disclosed embodiments includes accounting for diffuse and reflected radiation, e.g., when performing an optimization of a value function, determining orientations of PV modules, and when controlling PV modules to pivot in accordance with the optimization. Similarly, the systems and controllers described herein are preferably configured to similarly include accounting for diffuse and reflected radiation.

Figure 2:
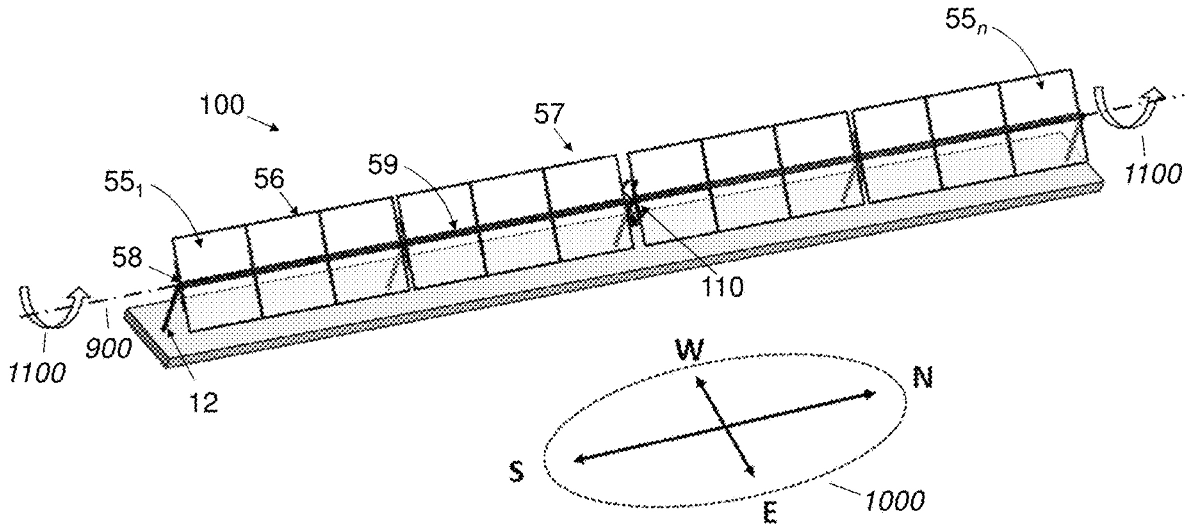
FIG. 2 shows a schematic layout of selected components of a PV energy system according to embodiments of the present invention.

Referring now to the figures, and in particular to FIG. 1, a PV energy system 100 according to embodiments includes a PV array 95 comprising a plurality of PV modules 57 (shown in FIG. 2). In embodiments, the PV array 95 includes a tracking component, i.e., a solar tracker, for increasing cumulative electricity generated over the course of a period of time.

The solar tracker, or simply 'tracker', changes the orientation of the PV panels so as to capture, i.e., convert, a higher or lower proportion of the direct irradiance falling on the panels over the course of any given period of time. Capture and conversion of the diffuse radiation component is usually unaffected, e.g., within ±5% or within ±10% or within ±20%, by the tracking. A single-axis tracker is one that rotates PV panels around a single axis; tracking, whether on-sun or off-sun, is generally from east to west over the course of a day around a north-south axis. A double-axis tracker is designed to pivot in two axes, and is configured to pivot the PV panels to 'face' the sun directly and not just in a single plane, so as to absorb all available direct irradiance if desired. Some double-axis trackers operate using Euler angles and are not, strictly speaking, rotating the PV panels about two Cartesian axes, but the results are substantially the same. The embodiments disclosed herein are described throughout the specification in terms of single-axis tracking, but their application, mutatis mutandis, to double-axis tracking, is within the scope of the present invention.

The PV energy system 100 of FIG. 1 additionally includes an inverter 190 for conversion of DC electricity to AC. An inverter can include electronic circuitry, for example for synchronizing the phase, and for matching the voltage and frequency of the power output to those of the grid. The PV array typically has an output rating in kilowatts peak (kWp) which is the maximum DC power output rating for a given set of standard of environmental and operating conditions such as, e.g., temperature.

As is known in the art, an inverter 190 can have a rating that is lower than the output rating of the array of PV modules. This is usually because the PV array 95 may have a sharp output peak in midday, and configuring the inverter 190 to convert and deliver all of the peak energy would mean that the inverter 190 is not fully utilized during most hours of the day—and of the year. Thus, the inverter 190 can be configured to 'clip' the peak output of the PV array so as to achieve better utilization of the inverter. An inverter may perform the clipping functionally electronically and/or electrically, for example by changing the electrical working point (current and voltage) of the PV array to make the PV modules less efficient.

FIG. 1 further illustrates a non-limiting example of a power flow scheme for a PV energy system 100: power generated by the PV array 95 flows to a charge controller 40 as indicated by arrow 901. Two-way power flow takes place between the charge controller 40 and an energy storage device 165, as indicated by two-way arrow 902. Power from the PV array 95 and the energy storage device 165 flows through the charge controller 40 to the inverter 190, as indicated by arrow 903. The inverter 190 can deliver energy to the electric grid 15, as indicated by arrow 904.

Referring now to FIG. 2, a PV energy system 100 according to embodiments includes one or more PV modules 57. The PV module 57 includes an array of n PV panels $\mathbf{55}_1$ through $\mathbf{55}_n$, joined to a support subassembly 58. The support subassembly 58 includes an array of frames 56 for mounting the PV panels 55, and a central elongated member 59 to which the frames 56 are joined. The central elongated member 59 serves to transfer a torque to rotate the frames 56 as a unit together with the central elongated member 59 and the PV panels 55. The PV module 57 is rotated about a central longitudinal axis indicated in FIG. 2 by dashed line 900, and the rotation is schematically represented by arrows 1100. The central elongated member 59 is pivotably supported by ground supports 12. As shown by axes 1000, the panels are facing generally east, indicating that FIG. 2 shows a morning orientation. The tracking of the PV module 57 is shown as being east-west tracking as is the case in the vast majority of current installations of PV modules, but the principles disclosed here are equally applicable to north-south tracking systems, mutatis mutandis.

Figure 3:
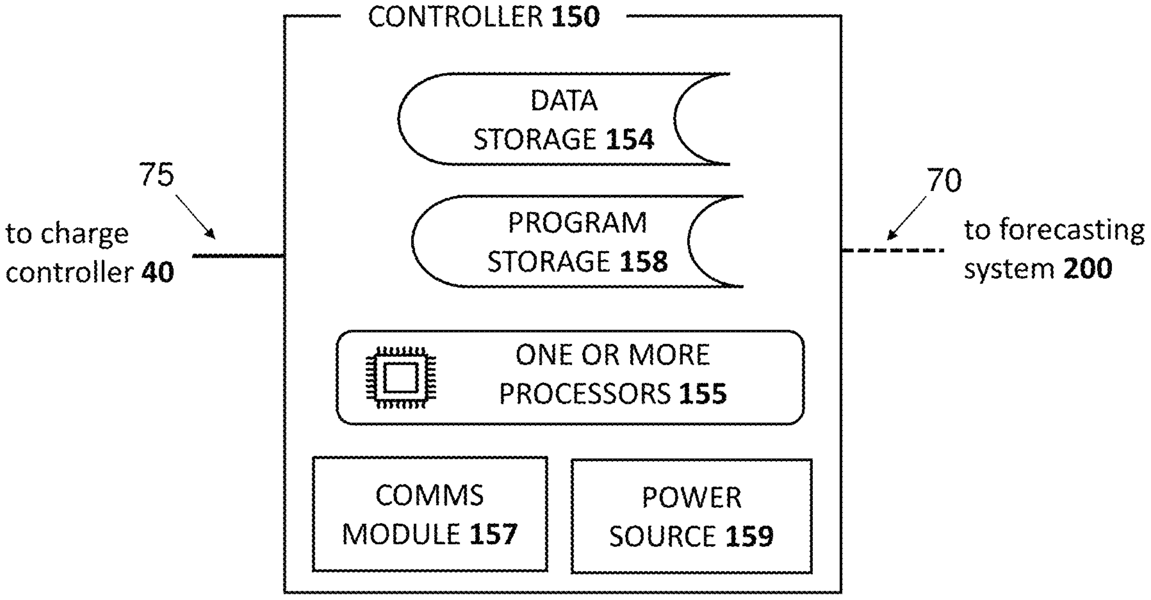
FIG. 3 shows a block diagram of a controller for a solar energy collection system, according to embodiments of the present invention.

An exemplary controller 150 for a PV energy system 100, according to embodiments, is illustrated schematically in FIG. 3 to show selected components. The exemplary controller 150 includes one or more computer processors 155, a computer-readable storage medium 158, a communications module 157, and a power source 159. The computer-readable storage medium 158 can include transient and/or transient storage, and can include one or more storage units, all in accordance with desired functionality and design choices. The storage 158 can be used for any one or more of: storing program instructions, in firmware and/or software, for execution by the one or more processors 155 of the control system 150. In embodiments, the stored program instructions include program instructions for operating a PV energy system 100 and/or solar energy collection system, including for optimizing a value function. Data storage 154, if separate from storage 158, can be provided for historical data, e.g., actual irradiance and/or forecast values, e.g., forecasted irradiance values, and other data related to the operation of the solar energy collection system 100. In some embodiments, the two storage modules 154, 158 form a single module. The communications module 159 is configured to establish communications links, e.g., and not exhaustively, via communication arrangements 70 with a forecasting system 200 (described below and illustrated schematically in FIG. 4), and with the charge controller 40 via communications arrangements 75. In some embodiments, a control system 150 does not necessarily include all of the components shown in FIG. 3. The terms "communications arrangements" or similar terms such as "communications links" as used herein mean any wired connection or wireless connection via which data communications can take place. Non-limiting and non-exhaustive examples of suitable technologies for providing communications arrangements include any short-range point-to-point communication system such as IrDA, RFID (Radio Frequency Identification), TransferJet, Wireless USB, DSRC (Dedicated Short Range Communications), or Near Field Communication; wireless networks (including sensor networks) such as: ZigBee, EnOcean; Wi-fi, Bluetooth, TransferJet, or Ultra-wideband; and wired communications bus technologies such as .CAN bus (Controller Area Network, Fieldbus, FireWire, HyperTransport and InfiniBand.

Figure 4:
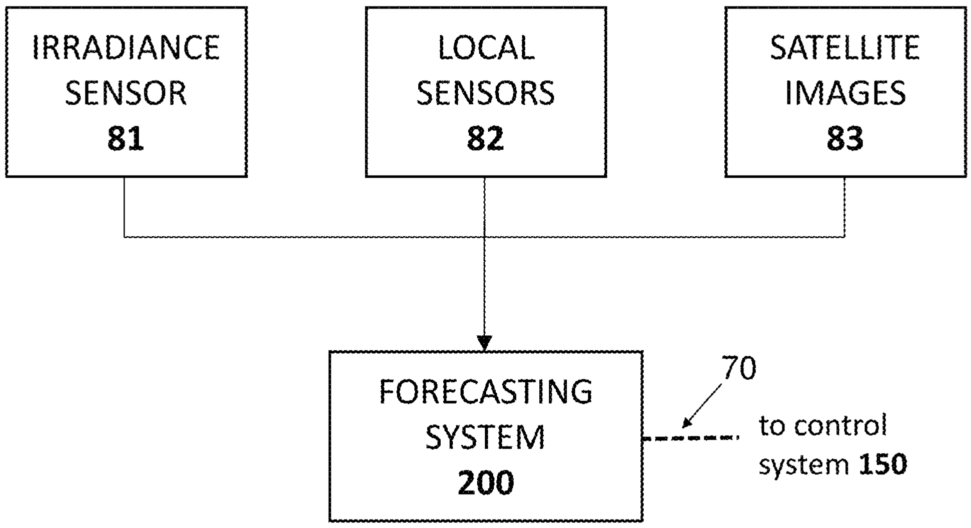
FIG. 4 shows a block diagram relating to a forecasting process, according to embodiments of the present invention.

In embodiments, it can be desirable to access forecasted irradiance data, e.g., for calculating electrical output of a PV array for an imminent future time period, e.g., a future time period beginning immediately following the time of the forecasting. This is sometimes called 'now-casting', or simply 'short-term forecasting'. FIG. 4 shows examples of components, according to embodiments, provided for working with a short-term forecasting system 200, which can optionally be onsite or nearby The non-exhaustive list of components includes one or more irradiance sensors 81, local meteorological sensors 82, and a source of satellite imagery 83. A future time period having a short-term forecast available from the forecasting system 200 can be as short as 5, 10 or 15 minutes, or as long as 30, 45 or 60 minutes. Longer-term forecasts can be acquired using internal or commercially available meteorological models and/or from external providers.

We now refer to FIGS. 5A, 5B, 6A, 6B, and 6C.

Figure 5A:
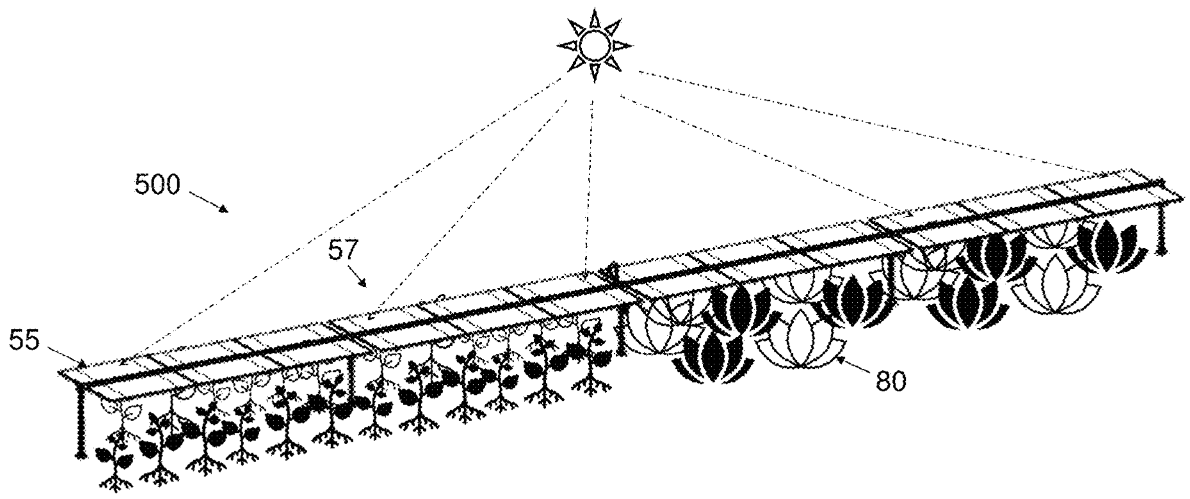
FIGS. 5A and 5B show schematic perspective and end views, respectively, of a solar energy collection system comprising a PV array and a group of plants, the solar radiation being primarily directed to PV conversion, according to embodiments of the present invention.
Figure 5B:
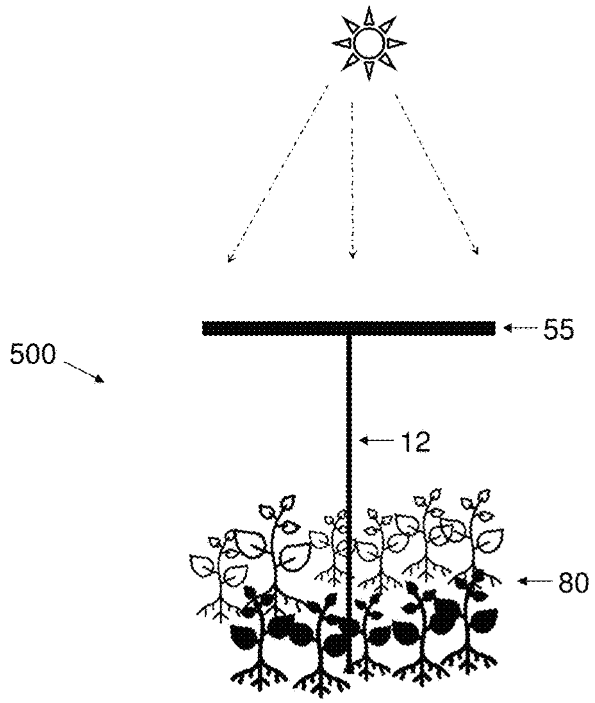

An exemplary solar energy collection system 500, is shown schematically in a perspective view in FIG. 5A, and in an end view in FIG. 5B. A solar energy collection system 500 according to embodiments includes an array of PV modules 57 comprising PV panels 55. PV modules may also comprise, as shown in FIG. 2, frames 56 for mounting the panels 55 and thereby connecting the panels 55 to the elongated torque transfer member 59 and the drive system 110. The drive system 110 includes a motor assembly directly controlled by the controller 150, and gearing arrangements for efficient pivoting of the PV array.

The solar energy collection system 500 also includes one or more groups of plants 80 that require exposure to solar radiation to grow crops therefrom. The term 'crops' is used broadly herein, and can mean any part of the plant with economic value when harvested and sold, and/or environmental value for absorption of carbon dioxide and/or soil retention. The plants can produce crops annually, or more frequently, or less frequently. In one example, the plants can produce crops over several growing seasons and then be prevented from producing crops for one or more growing seasons. The preventing can include any combination of causing a reduction in available solar energy and mechanically and/or chemically modifying the plants.

In embodiments, the ratio of PV area to plant area does not affect the methods used for operation the solar energy collection system, including the optimization of the value function, and the determining of PV panel orientations, although such a ratio may affect the respective weightings given to the components (PV and plants) in the make-up of the value function. In some embodiments, the total surface area of the PV panels 55 can equal at least 10%, or at least 20%, or at least 30%, or at least 40%, or a higher proportion, of the area occupied by the plants 80, and the value function may or may not be more heavily PV-weighted. In some embodiments, the total surface area of the PV panels 55 can equal less than 10%, or less than 5%, or less than 2%, or less than 1% of the area occupied by the plants, and the value function may or may not be more plants-weighted.

The PV modules and plants 80 are arranged so that in some, most or even all orientations of the pivotable PV panels 55, at least some solar radiation is blocked by the PV panels 55 from reaching at least a portion of the plants 80. In the illustrative and non-limiting example of FIGS. 5A and 5B, the panels 55 are oriented with respective active faces straight up. When the sun is 'overhead' i.e., at its highest point of a solar day, the PV panels 55 provide maximum shading to a group of plants 80—in other words, they block maximum solar radiation from reaching the shaded plants 80. Nonetheless, when the sun is at a low angle, e.g., early or late in the day, the PV panels 55 oriented face-up to the sky in the same manner would provide little or even no shade to the plants 80, i.e., most or even all of the solar radiation can then reach the plants 80 that are shaded when the sun is overhead. Thus, planning and optimizing the sharing of the solar resource needs to view solar radiation not as a single-dimensional variable, i.e., a given measure of kWh/m 2 at a given time, but takes into account the angle of the sun, e.g., as a function of the hour of the day, and the day of the year. On the other hand, if the solar energy collection system 500 includes multiple rows of plants 80 growing under and around multiple PV arrays of the type shown in FIGS. 5A and 5B, the low angle of the sun could cause the PV array of a first row to shade the plants of an adjacent row. This, too, is taken into account when constructing and evaluating/maximizing the value function.

Figure 6A:
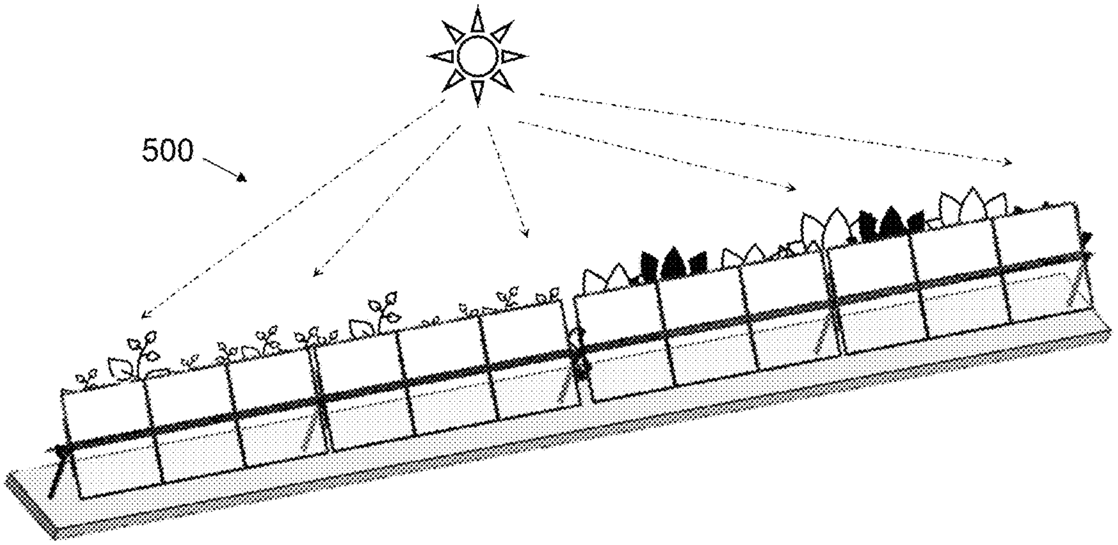
FIG. 6A shows a schematic perspective view of a solar energy collection system comprising a PV array and a group of plants, the solar radiation being primarily directed to crop growth, according to embodiments of the present invention.
Figure 6B:
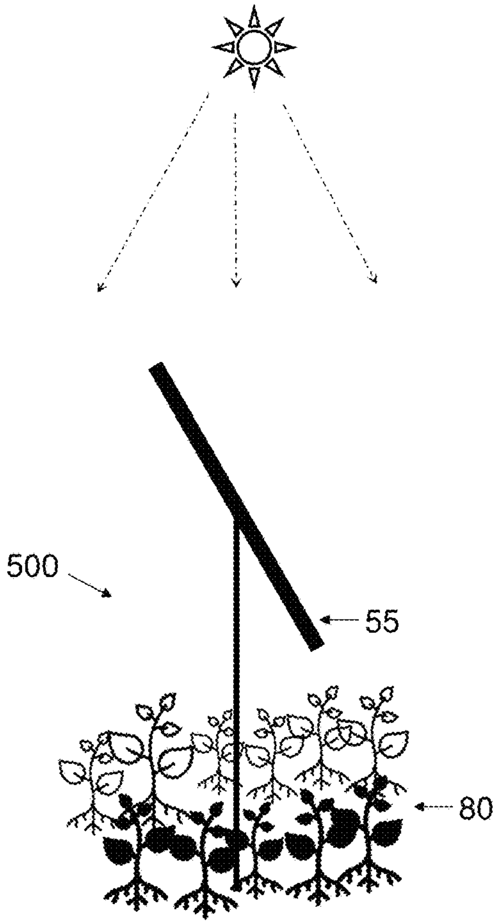
FIGS. 6B and 6C show schematic pe end views of a solar energy collection system comprising a PV array and a group of plants, the solar radiation being, respectively, partly and primarily directed to crop growth, according to embodiments of the present invention.
Figure 6C:
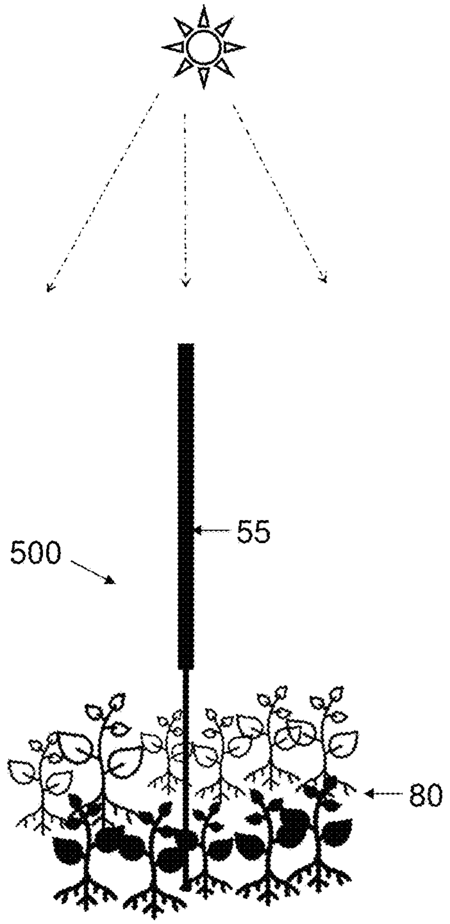

In contrast to FIGS. 5A and 5B, FIG. 6A shows the solar energy collection system 500 when the PV array is not facing the sun. In this orientation, most of the direct radiation from the overhead sun reaches the plants 80 at the expense of the PV panels 55. FIG. 6B shows a panel orientation where a relatively small portion of the direct radiation reaches the PV panels 55, and another portion of the direct radiation reaches the plants 80. FIG. 6C, where the panels are oriented at a 90° angle to the sun, substantially all the direct radiation reaches the plants 80.

Figure 7A:
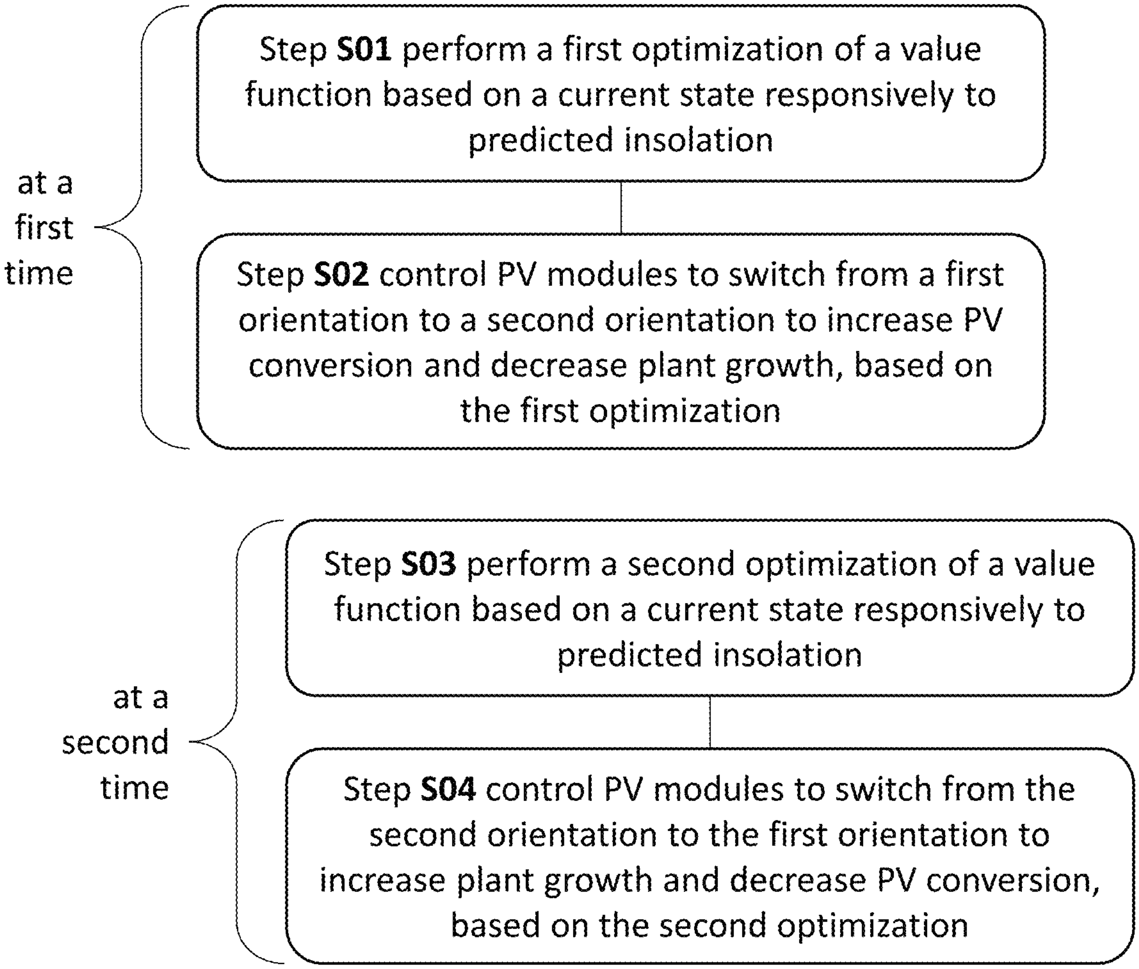
FIGS. 7A and 7B show flowcharts of methods and method steps for operating a solar energy collection system, according to embodiments of the present invention.

Referring now to FIG. 7A, a method is disclosed for operating a solar energy collection system 500, e.g., the solar energy system 500 of FIG. 5A or 6A. According to the method, the solar energy collection system 500 comprises a plurality of PV modules 57, and a group of plants 80 arranged to produce a crop. As illustrated by the flow chart in FIG. 7A, the method comprises at least the four method steps S01, S02, S03 and S04.

According to the method, Steps S01 and S02 are carried out, sequentially, at a first time.

Step S01 includes: performing a first optimization of a value function based on a current state, responsively to predicted insolation, by dynamically determining one or more orientations for the array of PV modules. As described earlier, changing an orientation of PV modules is effective to change the share of the solar resource directed to the PV modules 57 as well as the share directed to the plants. Generally speaking, when the share used for photovoltaic conversion is increased, the share used for photosynthetic conversion is decreased, and vice versa; however, when accounting for diffuse radiation, sun position, and increased or decreased optical efficiencies of the PV panels at different angles of incidence, it can also happen that one share increases (or decreases) and the other share doesn't change, and it can also happen that the two shares, in combination, increase or decrease. Any of these results of reorienting the PV panels is predictable based on insolation sensors and other instrumentation. The predicted results are used as a basis for performing the optimization.

In embodiments, a suitable value function can have the following general form:

$$\int_{t_0}^{t_n} (\mathrm{NET\_VALUE\_ADDED}_{PV} + \mathrm{NET\_VALUE\_ADDED}_{PLANTS}) + \mathrm{STATE}_{t_0}$$

wherein the optimization of the value function at time=$t_0$ is a maximization of the function over the future time period from time=$t_0$ to time=$t_n$. When step S01 is performed, to can be set to the current time. Time=$t_n$. may reflect the end of a growing season; the end of an accounting period, e.g., a year; the end of a time period with a preferential tariff for electricity selling prices; the end of a time period with a preferential price structure for selling crops produced by the plants 80, e.g., strawberries in winter; the end of a multi-year cycle of a multi-year growing regime, or any other desirable interval end.

In some embodiments, a suitable value function can have the following general form:

$$\int_{t_0}^{t_n}(\text{NET\_VALUE\_ADDED}_{PV})+\int_{t_0}^{t_n}(\text{NET\_VALUE\_ADDED}_{PLANTS})+\text{STATE}_{t_0}.$$

The value function incorporates desired outcomes with respect to electricity generation and crop-growing in a mathematical expression, either as incremental arithmetic inputs, or as system inputs or constraints. Illustrative examples of possible arithmetic inputs include, and not exhaustively: unit sales price of electricity at the time of generation; market value of crops grown in accordance with a growing schedule (and incremental or decremental value accruable to deviations from the growing plan); and amount of carbon dioxide absorbed by plant mass through photosynthesis. Illustrative examples of system inputs and constraints include, and not exhaustively: lifecycle cost of generating electricity above an inverter rating; minimum and maximum sales obligations of both electricity and crops; multi-season growing regimes that include or de-emphasize non-cultivation in some seasons; time remaining in the optimization interval from time=$t_0$ to time=$t_n$ and resource available in the remaining time available; and future market information on demand for electricity and/or crops.

In some embodiments, the optimization of the value function in Step S01 includes maximizing a revenue stream. In some embodiments, the optimization of the value function in Step S01 includes maximizing an indirect utility function, e.g., a societal or environmental utility function.

For assessing values of the function, all inputs and constraints must be assigned numeric values, both positive and negative as appropriate, in a manner that drives the optimization of the value function to meet the desired outcomes to the extent allowed by externalities such as, e.g., actual insolation over the full optimization interval. Numeric values need not be one-dimensional, and the value function or any of its components can be based on a matrix of parameter values that can eventually be combined in a function made accessible to the user for changing preferences.

Each of $\text{NET\_VALUE\_ADDED}_{PV}$ and $\text{NET\_VALUE\_ADDED}_{PLANTS}$ represents an incremental contribution, whether positive or negative, to the value function. Even if, for example, a dynamic determination of PV panel orientation results in lower revenue for a given time period, the determination of Step S01 is based on maximizing the value function over the chosen time interval and not necessarily on maximizing a short-term gain.

Step S02 includes: controlling at least one of the PV modules 57 to switch from a respective first orientation to a respective second orientation based on the results of the optimization of Step S01. This switch increases instantaneous photovoltaic conversion of incident solar radiation by the array of PV modules 57 and decreases instantaneous photosynthetic conversion of the incident solar radiation by the group of plants 80. In some embodiments, the switch increases a value of the current state $\text{STATE}_{t_0}$.

According to the method, Steps S03 and S04 are carried out, sequentially, at a second time. The second time is different than the first time, including earlier or later.

Step S03 includes performing a second optimization of a value function based on a current state, responsively to predicted insolation, by dynamically determining one or more orientations for the array of PV modules. Step S03 is functionally identical to Step S01, except that is occurs at a different time. The value function of Step S03 is the same value function as in Step S01, except that to and STATE to have different values.

Step S04 includes controlling at least one of the PV modules 57 to switch from the respective second orientation to the respective first orientation based on the results of the optimization of Step S01. This switch decreases instantaneous photovoltaic conversion of incident solar radiation by the array of PV modules 57 and increases instantaneous photosynthetic conversion of the incident solar radiation by the group of plants 80. In some embodiments, this switch also increases a value of the current state $\text{STATE}_{t_0}$. Step S04, while similar to Step S02, is actually the functional opposite of Step S02. In Step S02, the optimization of the value function at one time, i.e., in Step S01 leads the controller to re-orient the PV modules 57 to increase electricity production and decrease plant growth, while in Step S04 optimization of the value function at a second time, i.e., in Step S03, leads the controller to re-orient the PV modules 57 to decrease electricity production and increase plant growth. It can be that both switches, at different respective times, are made for increasing value of the value function.

Figure 7B:
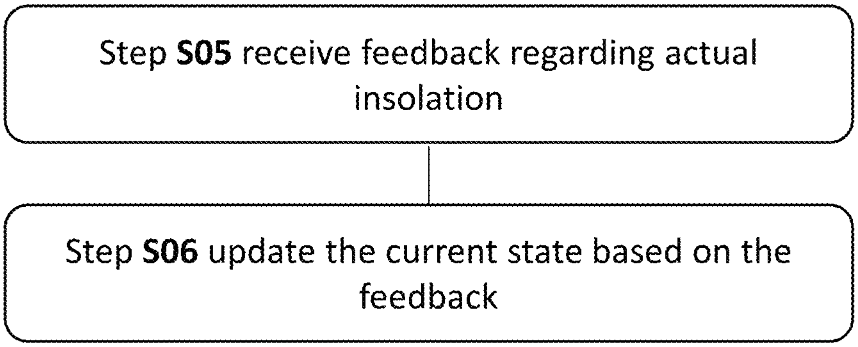

In some embodiments, the method additionally comprises method steps S05 and S06, as illustrated by the flow chart in FIG. 7B:

Step S05 includes receiving feedback regarding actual insolation, and in particular for a time period in the recent or immediate past for which an optimization of the value function was performed based on forecasted insolation. The feedback can be created using onsite irradiance-sensing equipment, and can include, e.g., the actual insolation data, or a mathematical representation of the deviation of the actual insolation from the forecast.

Step S06 includes updating the current state based on the feedback received in Step S05.

In embodiments, Steps S05 and S06 are performed periodically. In some embodiments, Steps S05 and S06 are performed before Step S01 and/or before Step S03.

In embodiments, some or all of the steps of the method can be carried out by a control system 150 of the PV energy system 100, e.g., the control system 150 of FIG. 3. In some embodiments, not all of the steps are necessarily performed.

We now refer to FIGS. 8, 9, 10A, 10B, 11 and 12, all of which show schematically drawing examples of incident insolation graphs, where the insolation is shared between 'PV' and 'plants', i.e., between photovoltaic conversion for generating electricity and photosynthetic conversion for growing crops. For purposes of clarity, the total insolation shown in each graph is for a clear-sky day, i.e., with no intermittency, for a 12-hour solar day, i.e., at or near an equinox. The splits, as described elsewhere in this disclosure, are obtained by performing an optimization of a value function based on a current state, responsively to predicted insolation, by dynamically determining one or more orientations for the array of PV modules, and controlling, based on the optimization of the value function, at least one of the PV modules to switch between a respective orientations.

Figure 8:
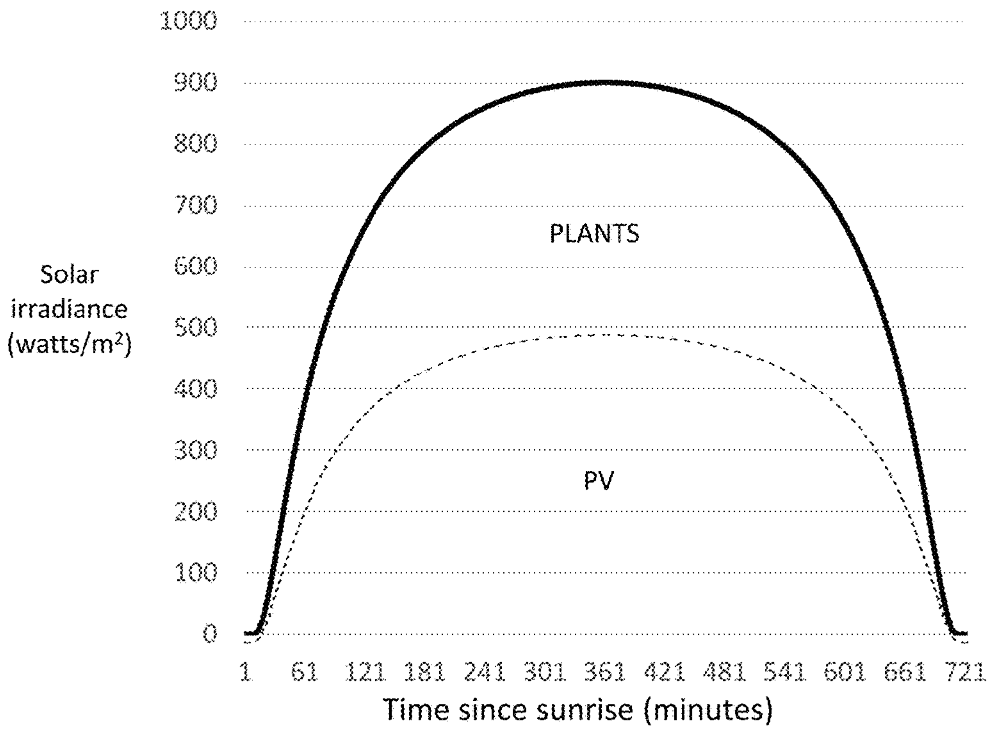
FIG. 8 shows an exemplary schematic graph of solar radiation divided between PV conversion and photosynthetic conversion over the course of a solar day, according to embodiments of the present invention.
Figure 9:
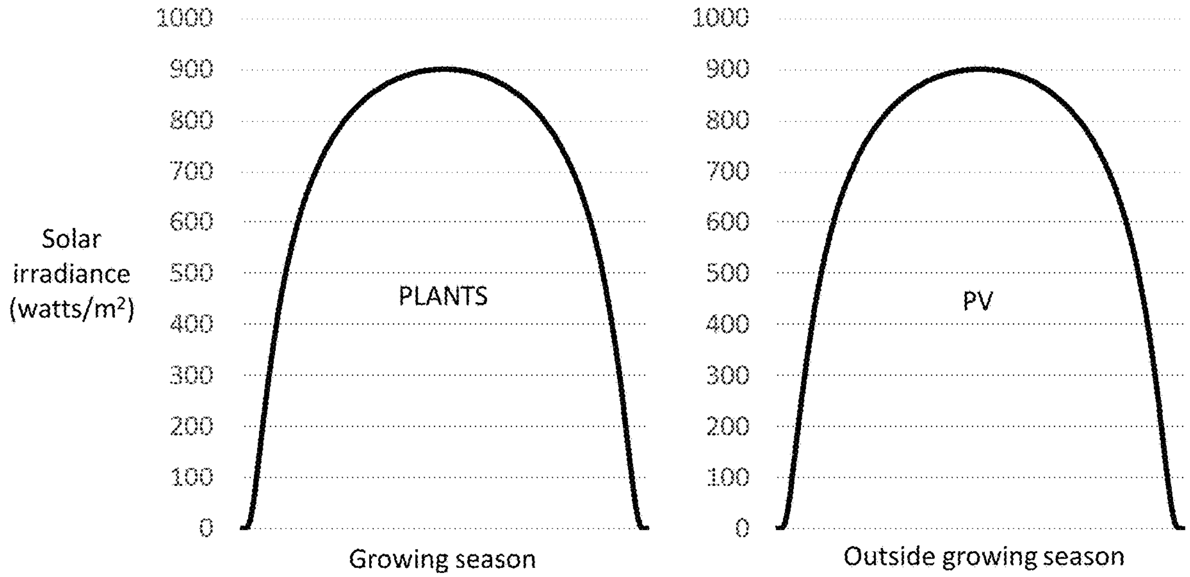
FIG. 9 shows an exemplary pair of schematic graphs of solar radiation usage differentiated by being during or outside of a growing season, according to embodiments of the present invention.

FIGS. 8 and 9 conceptually illustrate two respective approaches to sharing the incident solar radiation. In FIG. 8, a smoothed or idealized PV output curve is carved out of the insolation to emulate a smaller PV energy system. In FIG. 9, the plants are prioritized during the growing season, and the PV is prioritized outside the growing season. While these two approaches may be simple in and of themselves, the concepts may be incorporated in more sophisticated models that optimize the value function with greater granularity at each decision point.

Figure 10A:
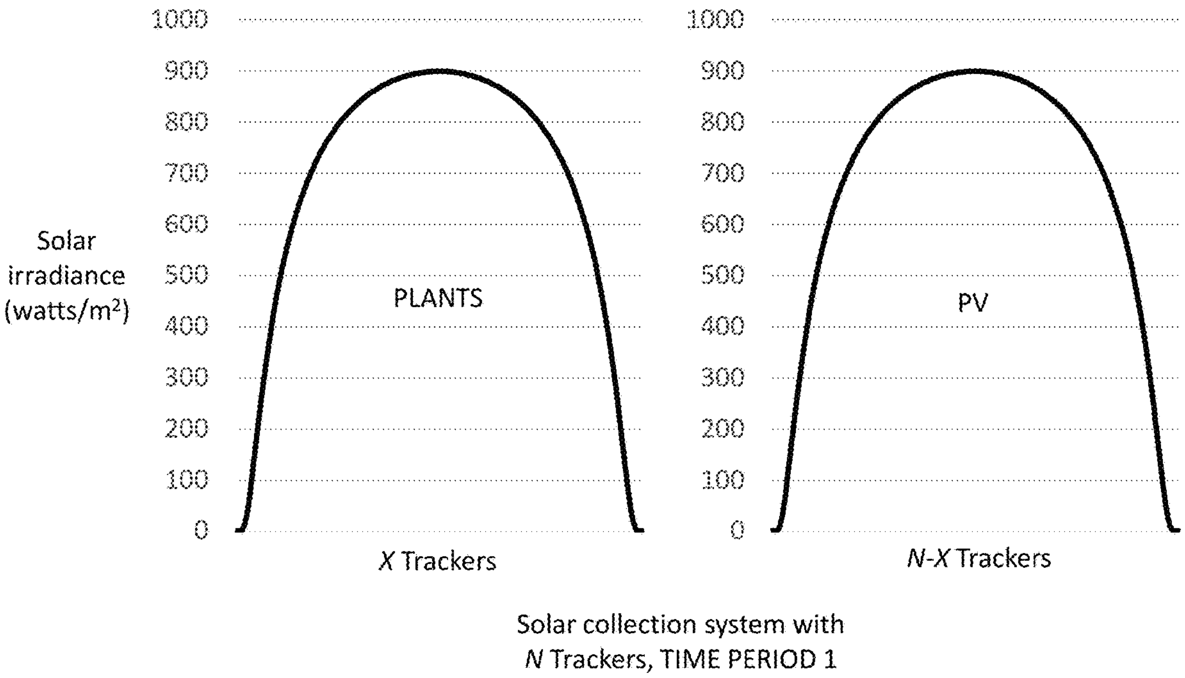
FIGS. 10A and 10B show respective exemplary pairs of schematic graphs of solar radiation usage for different groups of PV trackers within a solar energy collection system, over the course of a solar day in different respective time periods, according to embodiments of the present invention.
Figure 10B:
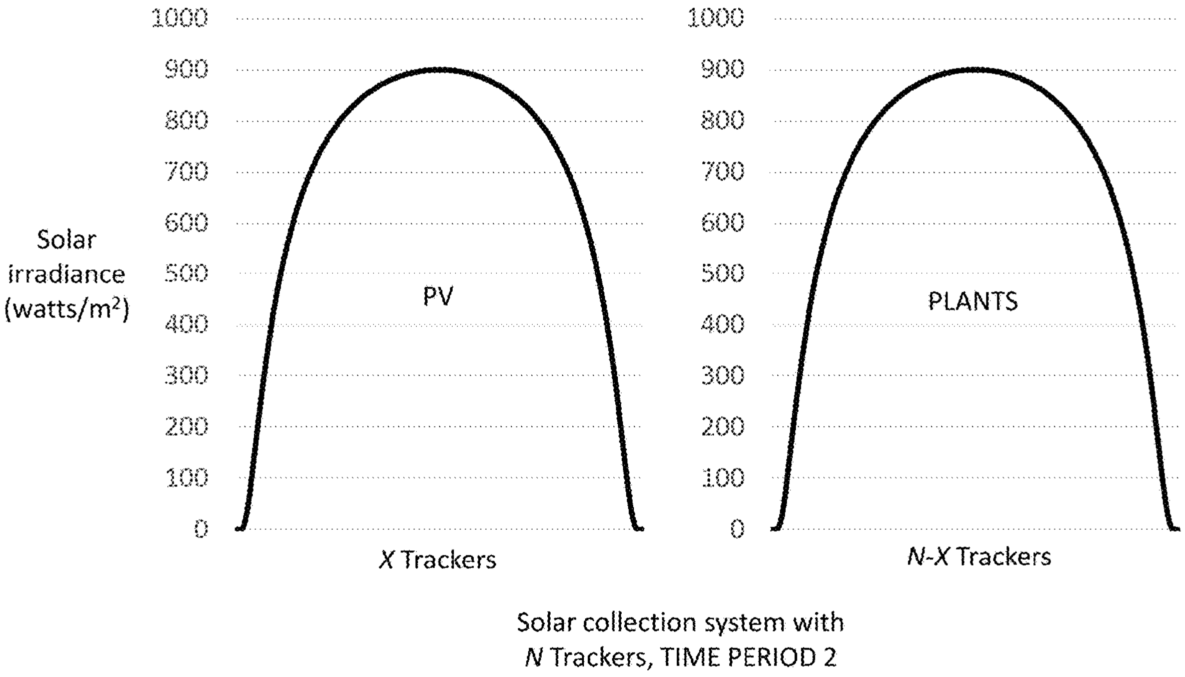

FIGS. 10A and 10B illustrate another basic concept for sharing insolation. Not all PV arrays in a PV energy system 100 or in a solar energy collection system necessarily pivot together, and an optimized solution for the value function at any given time may include directing the panels of different arrays to pivot to different orientations. In another non-limiting example, FIG. 10A illustrates a conceptual optimization strategy in which X trackers (out of a total of N trackers in a solar energy collection system) are shown directing maximum solar resource to the plants during a first time period (e.g., less than a day, a day, or longer than a day) whilst the remaining N-X trackers direct maximum solar resource to the PV panels during the same first time period. In a second time period, as represented in FIG. 10B, the X trackers direct maximum solar resource to the PV panels and the remaining N-X trackers direct maximum solar resource to the plants. In other words, the splitting of the insolation can be done at a coarser resolution than by splitting the insolation of a single tracker (i.e., of a single PV array) at a given time between the two consumers of solar radiation, i.e., PV and plants. In similar examples, not shown, the respective make-up of the X and N-X tracker groups can be changed, including between the first and second time periods of FIGS. 10A and 10B in accordance with the desired outcomes and the results of optimizing of the value function from time to time.

Figure 11:
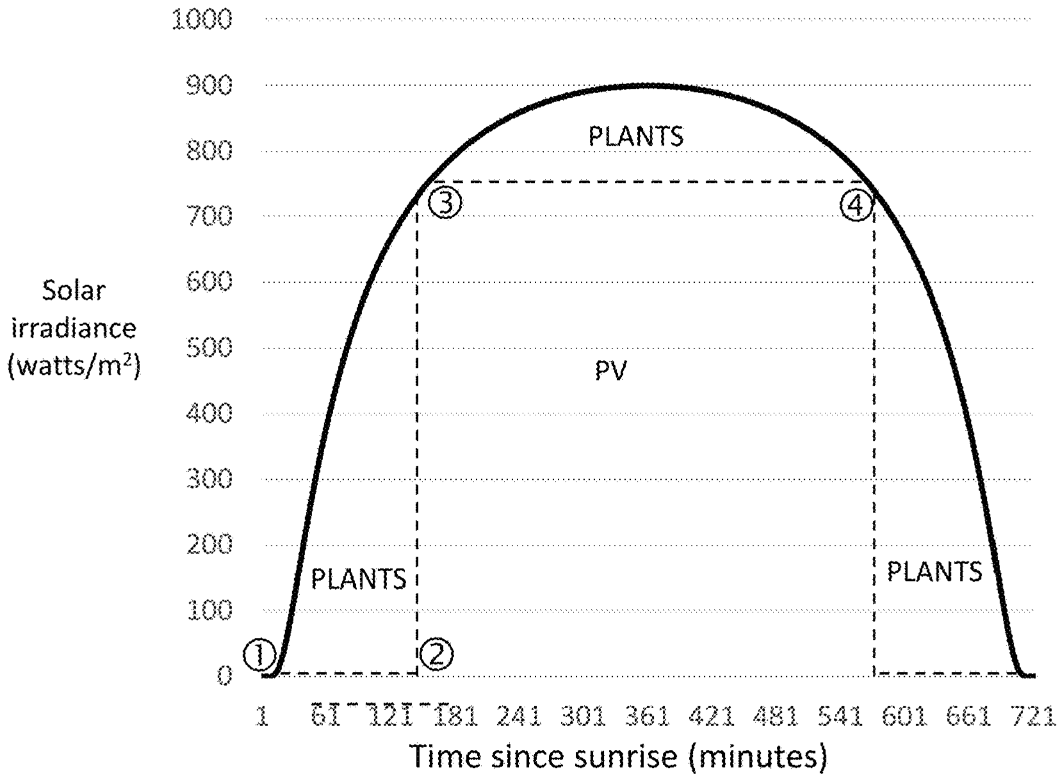
FIGS. 11 and 12 show exemplary schematic graphs of solar radiation divided between PV conversion and photosynthetic conversion over the course of a respective solar day, according to embodiments of the present invention.
Figure 12:
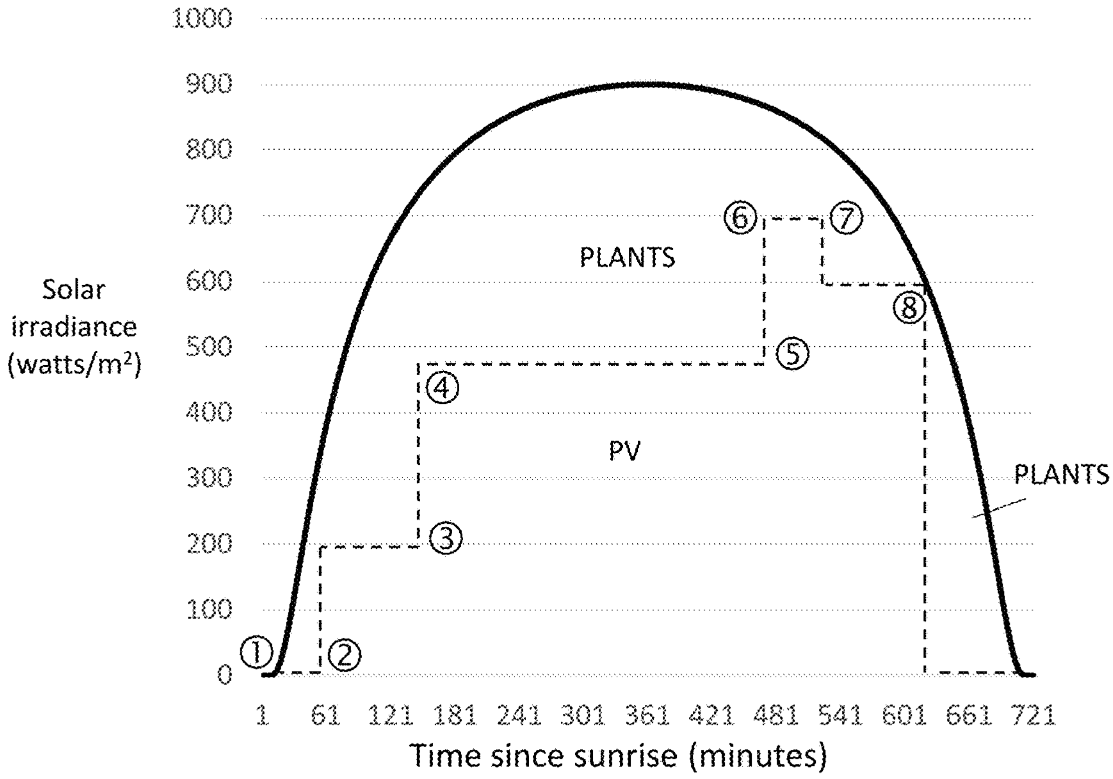

In contrast to FIGS. 9A-B and 10A-B, the non-limiting examples of FIGS. 11 and 12 illustrate splitting the solar resource in a manner that can be accomplished either at a coarse resolution, by combining the respective outputs of a number of PV arrays, or at a finer resolution, i.e., the level of the individual tracker where multiple trackers are all splitting insolation in accordance with the optimization at each decision point. Each approach may have its advantages and disadvantages. For example, in most cases, it does not matter which PV arrays produce the electricity that gets sold, while one cannot direct all of the solar radiation meant to be directed to 'plants' to a subset of the plants and accept optimal results. Therefore, in some embodiments, the value function can be biased in the direction of finer resolution where individual trackers can be directed to ensure that all of the plants receive needed insolation. In another example, the ratio of plants to PV, e.g., of the respective values or of the respective areas of active absorption of solar radiation, can be such that the finer-resolution approach is an unnecessary computational or mechanical burden, and the value function can be biased in the direction of 'coarser resolution' as described above. Both FIGS. 11 and 12 can serve as examples of the resource-sharing of a single PV array, of several PV arrays, or of a complete solar energy collection system for the given period of time.

FIG. 11 shows a sharing scheme which favors PV over plants for a midday period, 'perhaps' due to a differentiated tariff that rewards midday electricity more than generation at other times of day. The word 'perhaps' is intended to indicate that the underlying calculation of the value function does not necessarily translate in an intuitive manner to the visible results of the dynamic determination of orientation. Together with the PV-favoring 'bias' apparent from the schematic graph, the PV is cut off at a designated output level, and this is 'perhaps' because the designated output level is at or close to an inverter rating. Thus, starting at point ① in the graph, which corresponds to the effective sunrise, all of the early morning energy is directed to the plants. From point ②, most of the energy is directed to PV. Again, as noted earlier, this discussion ignores diffuse radiation, and also ignores any solar radiation that reaches the plants regardless of the orientation of the PV panels, e.g., if the planted area is larger than the shadow of any PV array. At point ③, as noted, the PV output is capped, for reasons that may be understood from the value function and the inputs and constraints thereof, and the continued increase in irradiance is then directed to plants. From point ④, the preference for PV output is removed, and the panels are directed to allow substantially all of the irradiance to reach the plants, until sunset.

FIG. 12 shows another sharing scheme which makes numerous switches to increase or decrease PV (or plants) during the course of a solar day. For a short time after point ① in the graph, which corresponds to the effective sunrise, all of the early morning energy is directed to the plants. From point ②, some radiation is shared with the PV array(s), and even more from point ③. At point ④, the PV share stabilizes, and the plants 'benefit' from the increasing irradiance. Only in mid-afternoon does the PV share increase again, at point ⑤, and it remains at its daily peak between points ⑥ and ⑦. From point ⑧, the value function's 'preference' for PV output is removed, and the panels are directed to allow substantially all of the irradiance to reach the plants, until sunset.

The skilled artisan will understand that the foregoing simplified discussion of the conceptual graphs in FIGS. 8-12 is intended to describe, at a high level, possible results of optimizing a function that can have a large number of input parameters and constraints. In actual implementation, it is not always possible to understand the reason for a particular determination of PV panel orientation, because of the complexity of the actual calculations.

Figure 13A:
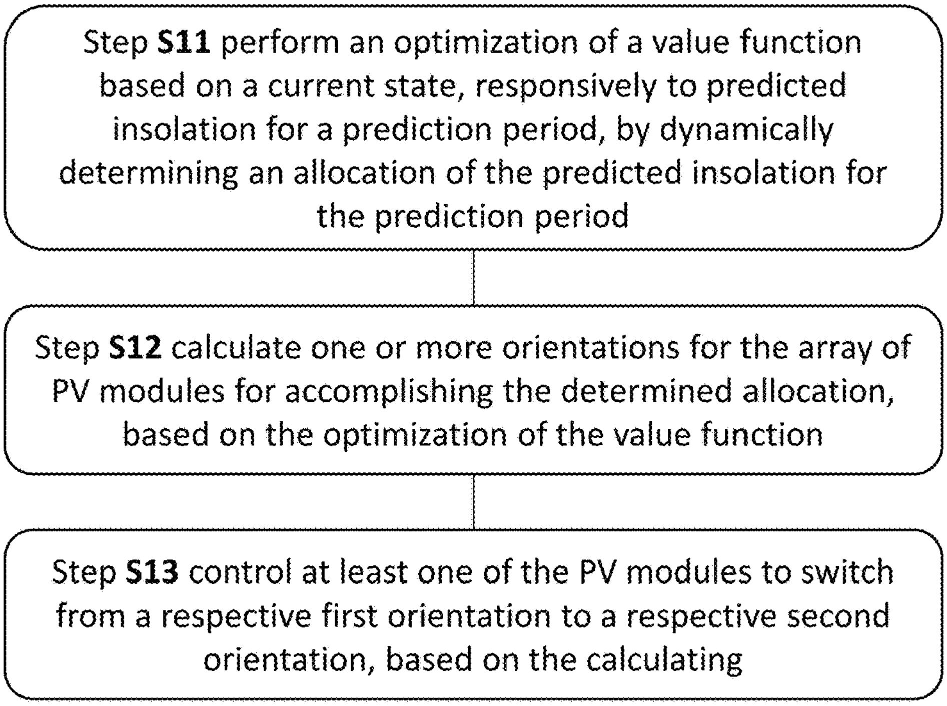
FIGS. 13A, 13B and 13C show flowcharts of methods and method steps for operating a solar energy collection system, according to embodiments of the present invention.

Referring now to FIG. 13A, a method is disclosed for operating a solar energy collection system 500, e.g., the solar energy system 500 of FIG. 5A or 6A. According to the method, the solar energy collection system 500 comprises a plurality of PV modules 57, and a group of plants 80 arranged to produce a crop. As illustrated by the flow chart in FIG. 13A, the method comprises at least the three method steps S11, S12 and S13.

Step S11 includes: performing an optimization of a value function based on a current state, responsively to predicted insolation for a prediction period, by dynamically determining an allocation of the predicted insolation between the PV modules and the plants for the prediction period. In some embodiments, the allocation can be made between diffuse radiation and direction radiation separately, and in other embodiments the allocation can be made for total insolation, e.g., and not exhaustively, in terms of percentage of the total, or watts or kilowatts. In some embodiments, the optimization of the value function includes maximizing a revenue stream and/or can be based in part on differentiated selling prices for electricity generated by the PV modules. In some embodiments, the optimization of the value function includes maximizing an indirect utility function, which can include one or both of: a societal utility function and an environmental utility function. In some embodiments, the indirect utility function is based on one or more of: adherence to a regulation, rule or standard; a contractual term (e.g., with an off-taker of the electricity or purchaser of the crops); projected short- and/or long-term health of the plants and/or a multi-year cultivation and harvesting plan; and a projected lifetime or lifecycle cost of one or more components of the PV modules.

In an example, the optimization of Step S11 can be based on a temperature such as an ambient temperature, and/or a temperature that would be experienced (internally or externally) by the plants if more or less sun were to impinge upon them, and/or an internal temperature of the PV modules 57 if a changed orientation would increase or decrease a conversion efficiency of the modules.

Step S12 includes: calculating one or more orientations for the array of PV modules 57 for accomplishing the allocation of predicted insolation as determined in Step S11, based on the optimization of the value function.

Step S13 includes: controlling at least one of the PV modules 57 to switch from a respective first orientation to a respective second orientation, based on the calculating of Step S12. The switching from the respective first orientation to the respective second orientation increases a value of the current state.

Figure 13B:
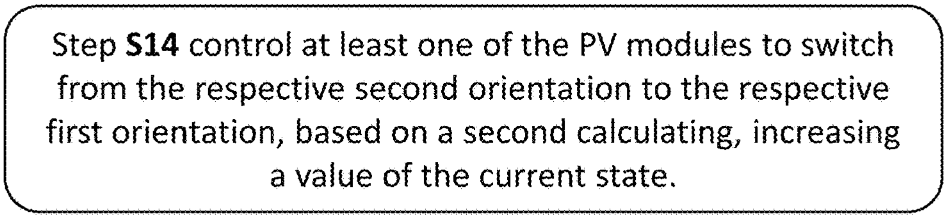

In some embodiments, the method additionally comprises method step S14, as shown in FIG. 13B.

Step S14 includes: controlling at least one of the PV modules 57 to switch from the respective second orientation to the respective first orientation, based on a second calculating. The switching from the respective second orientation to the respective first orientation increases a value of the current state. Step S14 is carried out at a second time, i.e., not at the time that Step S13 is carried out. In an example, Step S11 is repeated, and a new of an optimization of the value function is performed; then a second calculating of PV module orientations as per Step S12, and then the controlling (to switch orientation) of Step S14 is carried out on the basis of the new/second calculating which is based on the new/second optimization performance.

Figure 13C:
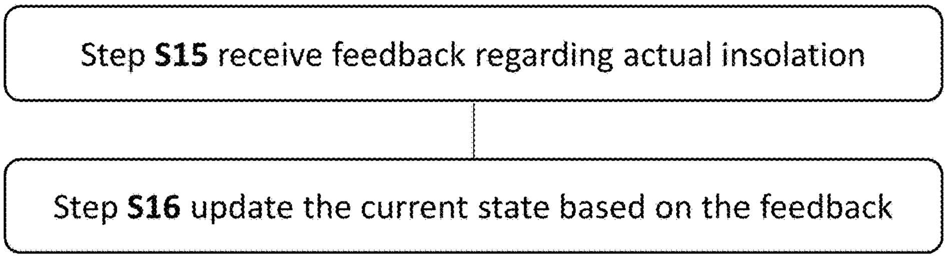

In some embodiments, the method additionally comprises method steps S15 and S16, as illustrated by the flow chart in FIG. 13C:

Step S15, which is similar to Step S05, includes receiving feedback regarding actual insolation, and in particular for a time period in the recent or immediate past for which an optimization of the value function was performed based on forecasted insolation. The feedback can be created using onsite irradiance-sensing equipment, and can include, e.g., the actual insolation data, or a mathematical representation of the deviation of the actual insolation from the forecast.

Step S16, which is similar to Step S06, includes updating the current state based on the feedback received in Step S15.

In embodiments, Steps S15 and S16 are performed periodically. In some embodiments, Steps S15 and S16 are performed before Step S11 and/or before Step S13. In embodiments in which Step S14 is performed, then Steps S15 and S16 can be performed before Step S14.

In embodiments, some or all of the steps of the method can be carried out by a control system 150 of the PV energy system 100, e.g., the control system 150 of FIG. 3. In some embodiments, not all of the steps are necessarily performed. In embodiments, any of the steps of any of the methods disclosed herein can be performed in any combination.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

The invention claimed is:

1. A solar energy collection system comprising:

a. an array of photovoltaic (PV) modules arranged to be pivoted about a longitudinal axis of the array by a drive system comprising an electric motor and a gearing arrangement;

b. a group of plants arranged to produce a crop; and c. a controller configured to control the array of PV modules, wherein the controller is configured to perform an optimization of a value function based on a current state thereof, responsively to predicted insolation, by dynamically determining one or more orientations for the array of PV modules, and to control, based on the optimization of the value function, at least one of the PV modules to switch between a respective first orientation to a respective second orientation to increase a first one of: (i) instantaneous photovoltaic conversion of incident solar radiation by the array of PV modules and (ii) instantaneous photosynthetic conversion of the incident solar radiation by the group of plants, and wherein the optimization of the value function is further based on maximizing combined revenues from electricity generation and crop selling.

2. The solar energy collection system of claim 1, wherein the switching between the respective first orientation to the respective second orientation is effective to decrease a second one of: (i) instantaneous photovoltaic conversion of incident solar radiation by the array of PV modules and (ii) instantaneous photosynthetic conversion of the incident solar radiation by the group of plants.

3. The solar energy collection system of claim 1, wherein the switching from the respective first orientation to the respective second orientation is effective to increase a value of the current state.

4. The solar energy collection system of claim 1, wherein optimizing the value function includes, applying one or more constraints selected from a regulation, a rule, a standard and a contractual term.

5. The solar energy collection system of claim 1, wherein the controller is configured to receive feedback regarding actual insolation, and to update the current state based on the feedback.

6. The solar energy collection system of claim 1, wherein the optimization of the value function is to the end of a crop-growing season.

7. The solar energy collection system of claim 1, wherein the optimization of the value function is to the end of an accounting period.

8. The solar energy collection system of claim 1, wherein the optimization of the value function is based in part on a multi-season crop-growing regime.

9. The solar energy collection system of claim 1, wherein the optimization of the value function is based in part on differentiated selling prices for electricity generated by the solar energy collection system.

10. A method of operating a solar energy collection system, the system comprising an array of pivotable photovoltaic (PV) modules and a group of plants arranged to produce a crop, the method comprising:

a. at a first time, i. performing a first optimization of a value function based on a current state, responsively to predicted insolation, by dynamically determining one or more orientations for the array of PV modules, and ii. controlling, based on the first optimization of the value function, at least one of the PV modules to switch from a respective first orientation to a respective second orientation to increase instantaneous photovoltaic conversion of incident solar radiation by the array of PV modules and decrease instantaneous photosynthetic conversion of the incident solar radiation by the group of plants; and b. at a second time, i. performing a second optimization of the value function based on a respective current state, responsively to predicted insolation, by dynamically determining one or more orientations for the array of PV modules, and ii. controlling, based on the second optimization of the value function, at least one of the PV modules to switch from the respective second orientation to the respective first orientation to decrease the instantaneous photovoltaic conversion and increase the instantaneous photosynthetic conversion wherein each of the first and second optimizations of the value function is further based on maximizing combined revenues from electricity generation and crop selling.

11. The method of claim 10, wherein each switching from the respective first orientation to the respective second orientation or from the respective second orientation to the respective first orientation increases a value of the current state.

12. The method of claim 10, wherein the optimizations of the value function include applying one or more constraints selected from a regulation, a rule, a standard and a contractual term.

13. The method of claim 10, additionally comprising: receiving feedback regarding actual insolation, and updating the current state based on the feedback.

14. The method of claim 10, wherein at least one of the first and second optimizations of the value function is to the end of a crop-growing season.

15. The method of claim 10, wherein at least one of the first and second optimizations of the value function is to the end of an accounting period.

16. The method of claim 10, wherein at least one of the first and second optimizations of the value function is based in part on a multi-season crop-growing regime.

17. The method of claim 10, wherein at least one of the first and second optimizations of the value function is based in part on differentiated selling prices for electricity generated by the solar energy collection system.

18. A method of operating a solar energy collection system, the system comprising an array of pivotable photovoltaic (PV) modules and a group of plants arranged to produce a crop, the method comprising:

a. performing an optimization of a value function based on a current state, responsively to predicted insolation for a prediction period, by dynamically determining an allocation of the predicted insolation between the PV modules and the plants for the prediction period;

b. calculating, based on the optimization of the value function, one or more orientations for the array of PV modules for accomplishing the determined allocation; and c. controlling, based on the calculating, at least one of the PV modules to switch from a respective first orientation to a respective second orientation, wherein the switching from the respective first orientation to the respective second orientation increases a value of the current state, and wherein the optimization of the value function is further based on maximizing combined revenues from electricity generation and crop selling.

* * * * *